(12) United States Patent
Veres

(10) Patent No.: US 12,246,269 B2
(45) Date of Patent: Mar. 11, 2025

(54) SEPARATING ELEMENT, SEPARATING DEVICE, FILTER ELEMENT, FILTER HOUSING, FILTER DEVICE, AND METHOD FOR SEPARATING GAS BUBBLES FROM A LIQUID

(71) Applicant: ARGO-HYTOS Group AG, Baar (CH)

(72) Inventor: Andras Veres, Heidelberg (DE)

(73) Assignee: ARGO-HYTOS Group AG, Baar (CH)

( * ) Notice: Subject to any disclaimer, the term of this patent is extended or adjusted under 35 U.S.C. 154(b) by 581 days.

(21) Appl. No.: 17/430,258

(22) PCT Filed: Feb. 11, 2020

(86) PCT No.: PCT/EP2020/053433
§ 371 (c)(1),
(2) Date: Aug. 11, 2021

(87) PCT Pub. No.: WO2020/165146
PCT Pub. Date: Aug. 20, 2020

(65) Prior Publication Data
US 2022/0134255 A1 May 5, 2022

(30) Foreign Application Priority Data
Feb. 12, 2019 (DE) .......................... 102019103508.2

(51) Int. Cl.
*B01D 19/00* (2006.01)
(52) U.S. Cl.
CPC ..... *B01D 19/0031* (2013.01); *B01D 19/0042* (2013.01)
(58) Field of Classification Search
CPC ............ B01D 19/0031; B01D 19/0042; B01D 35/00; B01D 19/00; F15B 21/041
See application file for complete search history.

(56) References Cited

U.S. PATENT DOCUMENTS 4,666,594 A * 5/1987 Schneider .............. B01D 19/02
96/204
5,039,486 A * 8/1991 Gordon ............... A61M 1/3627
210/321.62

(Continued)

FOREIGN PATENT DOCUMENTS

CN 2712904 Y 7/2005
CN 1982340 A 6/2007
(Continued)

OTHER PUBLICATIONS

Office Action from EP patent application No. 20 705 038.6, dated Jul. 21, 2022.
(Continued)

*Primary Examiner* — Waqaas Ali
(74) *Attorney, Agent, or Firm* — Cesari and McKenna, LLP

(57) ABSTRACT

This disclosure relates to a separating element for separating gas bubbles from a liquid, in particular from hydraulic oil, which includes a volume body with an open-pored material structure which has a plurality of cells which are arranged offset with respect to one another in such a manner that a plurality of flow paths for guiding gas bubbles through the material structure run in labyrinth-like manner, wherein the material structure includes at least one contact region in which at least two of the flow paths approach one another at least in sections, so that, in operation, the gas bubbles guided on the flow paths contact one another and thus join together to form a larger gas bubble. The disclosure further relates to a separating unit, a filter element, a filter housing, a filter device and a separating method.

5 Claims, 5 Drawing Sheets

(56) References Cited

U.S. PATENT DOCUMENTS

| | | | |
|---|---|---|---|
| 7,364,609 | B2 | 4/2008 | MacDuff |
| 2006/0102007 | A1 | 5/2006 | Martin |
| 2012/0162309 | A1 | 6/2012 | Paschkewitz et al. |
| 2013/0155130 | A1 | 6/2013 | Paschkewitz et al. |
| 2015/0251941 | A1 | 9/2015 | Clark |
| 2018/0334231 | A1 | 11/2018 | Hansen |

FOREIGN PATENT DOCUMENTS

| | | | | |
|---|---|---|---|---|
| CN | 102985701 | A | 3/2013 | |
| CN | 202786135 | U | 3/2013 | |
| CN | 103055550 | A | 4/2013 | |
| CN | 104203362 | A | 12/2014 | |
| CN | 105330062 | A | 2/2016 | |
| CN | 107614895 | A | 1/2018 | |
| CN | 107635638 | A | 1/2018 | |
| CN | 208193750 | U | 12/2018 | |
| CN | 109152966 | A | 1/2019 | |
| CN | 210409775 | U | 4/2020 | |
| DE | 69119683 | T2 | 10/1996 | |
| DE | 102008060723 | | 10/2009 | |
| DE | 102014000903 | A1 * | 7/2015 | ............ B01D 29/21 |
| DE | 102014222510 | A1 | 5/2016 | |
| EP | 0253467 | A2 | 1/1988 | |
| EP | 0231993 | B1 | 4/1990 | |
| EP | 0457359 | | 11/1991 | |
| EP | 1029975 | A1 | 8/2000 | |
| EP | 3138617 | A1 | 3/2017 | |
| FR | 2902667 | B1 | 4/2011 | |
| GB | 892663 | A | 3/1962 | |
| GB | 1372561 | A | 10/1974 | |
| JP | 11114453 | A | 4/1999 | |
| JP | 5992784 | B2 | 9/2016 | |
| WO | WO-2012017055 | | 2/2012 | |
| WO | WO-2018013072 | A1 | 1/2018 | |

OTHER PUBLICATIONS

CN Office Action dated Nov. 9, 2021, CN Patent Application No. 201910691657.X, filed Jul. 30, 2019.

PCT Notification of Transmittal of Translation of the International Preliminary Report on Patentability, and the Written Opinion of the International Searching Authority, International Application No. PCT/EP2020/053433, mailed Aug. 26, 2021, 8 pages.

CN Office Action dated Jun. 17, 2021, Patent Application No. 201910691657.X, filed Jul. 30, 2019.

PCT International Search Report, International Searching Authority, International Application No. PCT/EP2020/053433, mailed Apr. 2, 2020, 5 pages.

German Office Action dated Aug. 19, 2019 for DE patent application No. 10 2019 103 508.2.

German Office Action dated Nov. 15, 2021 for DE patent application No. 10 2019 103 508.2.

* cited by examiner

SEPARATING ELEMENT, SEPARATING DEVICE, FILTER ELEMENT, FILTER HOUSING, FILTER DEVICE, AND METHOD FOR SEPARATING GAS BUBBLES FROM A LIQUID

CROSS REFERENCE TO RELATED APPLICATIONS

The present application is a National Stage of International Application No PCT/EP2020/053433, filed Feb. 11, 2020, which application claims priority to commonly owned German Patent Application No. 102019 103508.2, filed on Feb. 12, 2019, which applications are incorporated herein by reference in their entirety.

TECHNICAL FIELD

The invention relates to a separating element, a separating unit, a filter element, a filter housing, a filter device and a method for separating gas bubbles from a liquid.

BACKGROUND

In general, filter systems are known that filter out solid particles contained in a fluid, such as hydraulic oils, lubricating oils or engine oils, and thus clean it. Well-known filter systems for the filtration of fluids include line filters, suction filters and return filters. A generally known problem is the air contained in the oil, which is trapped in the oil in the form of air bubbles. Due to the physical properties of air bubbles, they cannot be filtered out of the oil. The air bubbles flow through the filter element of the filter and are thus finely crushed and then mixed back into the oil. Since the filter elements have to filter out increasingly smaller solid particles due to increasing demands on fluid purity, the filter materials of the filter elements are more closely meshed and thus the air bubbles in the oil are atomized more and more finely.

In particular in modern tank filter systems, admixing of the crushed air bubbles into the oil poses a considerable problem, as the air content in the oil is taken into account in the design of the tank volume. Such tank filter systems treat a small amount of fluid with an increased volume flow, which results in a high input of air bubbles into the oil in the tank. In addition, new synthetic oils and additives are increasingly used to prevent foam formation in the region of the oil surface in the tank. This results in a further increase in the content of air in the form of small-sized air bubbles in the tank filter systems.

From DE 10 2014 000 903 A1, for example, a filter device with a filter element is known which separates gases or air from a fluid by means of a media layer with coalescence properties. Furthermore, the filter element has a filter layer for the filtration of solid particles. The disadvantage here is that the air bubbles have a short residence time in the media layer. This reduces the probability that air bubbles will collide and join together to form larger air bubbles. Thus, due to the media layer, air bubbles can be separated from the fluid only to a reduced extent.

It is therefore an object of the invention to provide a separating element which, by means of an improved internal design, has increased efficiency for separating gas bubbles from a liquid. It is a further object of the invention to provide a separating unit, a filter element, a filter housing, a filter device and a method for separating gas bubbles from a liquid.

SUMMARY

According to the invention, the object is achieved with regard to the separating element by the subject matter of the claims. With regard to the separating unit, the filter element, the filter housing, the filter device and the method for separating gas bubbles from a liquid, the aforementioned object is solved by the subject matter of the claims.

Specifically, the object is achieved by a separating element for separating gas bubbles from a liquid, in particular from hydraulic oil. The separating element comprises a volume body with an open-pored material structure which has a plurality of cells which are arranged offset from one another in such a manner that a plurality of flow paths for guiding gas bubbles through the material structure run in labyrinth-like manner. The material structure comprises at least one contact region in which at least two of the flow paths approach one another at least in sections, so that during operation, the gas bubbles guided along the flow paths contact one another and thus join together to form a larger gas bubble.

The invention has several advantages. Due to the offset arrangement of the cells and the associated labyrinth-like course of the flow paths through the volume body, the residence time of the gas bubbles when flowing through the volume body increases. In other words, by means of a large number of deflections, the gas bubbles are guided three-dimensionally through the volume body and thus, the residence time of the gas bubbles is advantageously increased. The flow paths approach each other in the contact region, so that the gas bubbles guided in the flow paths collide with one another. In the course of this, the gas bubbles join together to form a larger gas bubble. This is referred to as coalescence of the gas bubbles. It is conceivable that a plurality of, in particular more than two, flow paths approach each other in the contact region in such a manner that during operation, a plurality of gas bubbles join together to form a larger gas bubble by contacting each other.

Advantageously, the larger gas bubble has a higher buoyancy force (Archimedean principle), so that it can be easily discharged from the liquid or rises faster there. Due to the labyrinth-like guidance of the gas bubbles through the volume body or the extension of the residence time of the gas bubbles, the initially small gas bubbles and subsequently larger gas bubbles can join together along the flow paths with further gas bubbles to form ever larger gas bubbles.

The invention therefore has the great advantage that due to the labyrinth-like course of the flow paths, an enlargement of the gas bubbles takes place, thereby efficiently separating them from the liquid.

The invention has the further advantage that due to the volume body or the material structure, an outflow velocity of the liquid can be lower than an inflow velocity of the liquid. The flow of the liquid is homogenized by the material structure, in particular by the cells offset to each other, advantageously resulting in an enlarged outlet region at the volume body. The reduced, homogenized outlet flow of the liquid advantageously facilitates the buoyancy of the outflowing gas bubbles. It is also conceivable that the outflow velocity of the liquid downstream of the volume body corresponds to the inflow velocity upstream of the volume body. In other words, the liquid can flow through the volume body with almost no slowing down.

Preferred embodiments of the invention are specified in the subclaims.

In a particularly preferred embodiment, at least two flow paths approach each other in several contact regions at least in sections for joining together the gas bubbles. It is conceivable that a plurality of the flow paths running through the volume body alternately approach each other. Likewise, a single flow path can approach another single flow path and/or several further single flow paths. In other words, individual flow paths of the gas bubbles are brought together several times in the volume body. This increases the collision probability of the guided gas bubbles and thus facilitates the enlargement of the gas bubbles to form larger gas bubbles. Furthermore, it is advantageous that the already enlarged gas bubbles join together along the flow paths with further gas bubbles to form even larger gas bubbles. This further increases the buoyancy force of the gas bubbles, causing them to gas out of the liquid more quickly.

In a preferred embodiment, the flow paths run through the material structure, depending on a cell size of adjacent cells. The cell size of the cells can increase continuously along the respective flow path. In other words, proceeding from a small cell, the respective flow path can run through increasingly larger cells. This ensures advantageously that an initially small gas bubble, which joins together with other gas bubbles along the flow path to form ever larger gas bubbles, can flow through the cells and thus the volume body.

In another preferred embodiment, the cells each comprise a cell space with a plurality of cell openings. Adjacent cells are joined together through the cell openings in such a manner that a labyrinth-like course of the flow paths is formed. In other words, the flow paths run through the cell openings from cell space to cell space, so that a labyrinth-like course of the flow paths is formed. The flow paths are three-dimensionally deflected by the material structure. Preferably, at least two adjacent cells have at least one common cell opening. The cells also comprise a plurality of cell webs that delimit the cell openings. The adjacent cells can be connected to each other by the cell webs. A first cell and at least one adjacent further cell may have at least one common cell web.

The adjacent cells are arranged offset to one another. The respective flow path of the gas bubbles is deflected from one cell to the next cell. The flow path of the gas bubble can be provided depending on a size of the gas bubble. If the gas bubble is smaller or the same size as the cell opening, the gas bubble can flow through the cell opening from one cell into the adjacent further cell. Thus, depending on the size of the cell opening, the gas bubbles can be guided through the material structure via the respective flow path. Preferably, the material structure forms a grid structure and/or a honeycomb structure.

Advantageously, this creates a labyrinth-like course of the respective flow path, whereby the residence time of the gas bubbles in the volume body is extended and thus the probability of colliding or joining together with other gas bubbles to form larger gas bubbles is increased.

In a particularly preferred embodiment, the cells are formed in such a manner that gas bubbles that are larger than the individual cell openings are deposited in the cell space between the cell openings. Gas bubbles which are larger than the cell openings can be deposited in the cell spaces until the vertical acceleration energy, in particular the buoyancy velocity, is smaller than the flow velocity of the liquid. The gas bubbles may be stored detachedly in the cell spaces. Alternatively, the gas bubbles can adhere to the material structure of the volume body. From a microscopic point of view, the cells of the material structure adsorb the gas bubbles. This has the advantage that large gas bubbles are absorbed in the cell spaces of the cells and thus are separated from the liquid.

From a macroscopic point of view, the large gas bubbles are thus absorbed by the separating element.

Preferably, the cell openings of an individual cell are of different sizes. This is advantageous in achieving a sieving effect with a large number of adjacent cells. The cell openings of an individual cell can also be of the same size. Depending on the gas bubble size and the respective size of the cell openings, the gas bubbles can flow from cell to cell and. Thus, depending on the size of the gas bubbles, the gas bubbles can be led into corresponding contact regions in which the gas bubbles join together with other gas bubbles. The gas bubbles can always follow a flow path that allows the respective gas bubble to flow through one of the cell openings of the adjacent cells.

More preferably, the cells have a different cell size and/or a different cell shape. This advantageously enables a plurality of flow paths through which gas bubbles of different sizes can be guided into corresponding contact regions for joining together with other gas bubbles. Furthermore, this results in a labyrinth-like, in particular three-dimensional, course of the flow paths through the volume body, which facilitates coalescence of the individual gas bubbles.

In a particularly preferred embodiment, the volume body is made of a material which has a low specific surface energy, in particular surface tension, and/or a microstructure for improved adhesion of gas bubbles. Specifically, the individual cell webs may have a low surface tension and/or a microstructure. Preferably, the microstructure of the cell webs is formed by a nanocoating. It is advantageous here that very small or dispersed gas bubbles adhere to the surface of the material structure of the volume body when flowing through and are thus separated. The microstructure and the low surface tension of the material facilitate the adhesion and thus the accumulation of the gas bubbles in the individual cells. The individual cell webs of a cell each form an adhesion region to which the dispersed gas bubbles adhere. Due to the offset arrangement of the cells and thus the cell webs, labyrinth-like flow paths of the gas bubbles are formed. The flow paths are deflected three-dimensionally in the volume body. This extends the residence time of the very small gas bubbles in the volume body in order to adhere to the surface of the material structure or the cell webs.

In a preferred embodiment, the volume body is made of a material that has a small contact surface with respect to liquids. When flowing through the volume body or the individual cells, the surface tension of the liquid is maintained due to the small contact surface of the volume body material (lotus effect). A deposition of the liquid at the material structure is thereby advantageously prevented and adhesion and/or adsorption of gas bubbles, in particular of small gas bubbles, are/is supported.

The volume body can be formed from a fluorine-containing plastic, especially PTFE. This has the advantage that fluorine-containing plastics have a low specific surface energy and thus improve adhesion or adsorption of gas bubbles, especially small gas bubbles.

Furthermore, the volume body can be formed by a three-dimensional plastic fabric or open-pored foam, in particular plastic foam or metal foam, or a sintered 3D printing material. Hereby, the volume body can be produced in an advantageously inexpensive and simple manner.

A secondary aspect of the invention relates to a separating unit for separating gas bubbles from a liquid, in particular hydraulic oil, with at least one separating element according to the invention, which can be mounted on a filter element and/or a filter housing, in particular a filter outlet tube. The separating unit may also comprise a support element on which the separating element is provided. The separation element may be provided on the support element to be interchangeable. The separating unit may comprise at least one adapter part for detachably fastening to the filter element and/or to the filter housing. The adapter part may be arranged on the support element. The separating unit advantageously enables simple and quick installation, e.g. on existing filter devices, filter elements and filter housings.

Within the scope of the invention, there is disclosed and claimed a filter element for cleaning liquids, in particular hydraulic oil, which has at least one separating element according to the invention. The filter element comprises an inlet side and an outlet side, wherein at least one filter layer for filtering solids present in the liquid is arranged between the inlet side and the outlet side. The separating element is provided on the outlet side to separate gas bubbles contained in the liquid. Preferably, the separating element is provided as a unit with the filter element.

Furthermore, a filter housing, in particular a filter outlet tube, with at least one separating element according to the invention for separating gas bubbles from a liquid, in particular hydraulic oil, is disclosed and claimed within the scope of the invention.

Another secondary aspect of the invention relates to a filter device, in particular a return filter and/or a suction filter and/or a return suction filter, for cleaning liquids. Particularly preferably, the filter device comprises at least one separating element and/or at least one separating unit and/or at least one filter element and/or at least one filter housing according to the claims. The filter device can preferably be used in a tank filter system in order to reduce the content of gas bubbles in the tank. In doing so, the gas bubbles in the liquid are separated from the liquid by the separating element. The filter device has the advantage that the introduction of gas bubbles into the tank or into the liquid contained in the tank is reduced.

Especially in connection with the so-called "downsizing" of drive motors with regard to consumption minimization, there are increasingly faster circulation times of the liquid, e.g. between the tank and the use in the motor. At the same time, with regard to the reduction in installation space, increasingly smaller circulating quantities are required, so that the storage time of the liquid in the tank, which would otherwise normally be provided for, is no longer sufficient to ensure appropriate separation of gas bubbles.

In a preferred embodiment of the invention filter device according to the invention, the separating element is arranged between the filter element and the filter housing, which has a plurality of outlet openings through which the liquid flows out of the filter housing during operation.

In a method according to the invention of separating gas bubbles from a liquid there is provided a separating element through which a liquid with gas bubbles contained in the liquid flows. The separating element comprises a volume body with an open-pored material structure which has a plurality of cells which are arranged offset from one another in such a manner that a plurality of flow paths for guiding gas bubbles through the material structure run in a labyrinth-like manner. The material structure comprises at least one contact region in which at least two of the flow paths approach one another at least in sections, so that during operation, the gas bubbles guided on the flow paths are contacted and joined together to form a larger gas bubble.

In a preferred embodiment of the method according to the invention, a surface boundary layer of the gas bubbles is destroyed during contacting, so that the gas bubbles join together to form a larger gas bubble in order to increase the buoyancy force of the gas bubbles in the liquid. Such joining together of the gas bubbles to form a larger gas bubble is called coalescence.

With regard to the advantages of the method, reference is made to the advantages explained in connection with the separating element. Moreover, the method may alternatively or additionally include individual features or a combination of several features previously mentioned with respect to the separating unit, the filter element, the filter housing and the filter device.

In the following, the invention is explained in more detail with reference to the accompanying drawings. The illustrated embodiments are examples on how the separating element according to the invention, the filter element according to the invention, the filter housing according the invention and the filter device according to the invention can be configured.

DESCRIPTION

Figure 1:
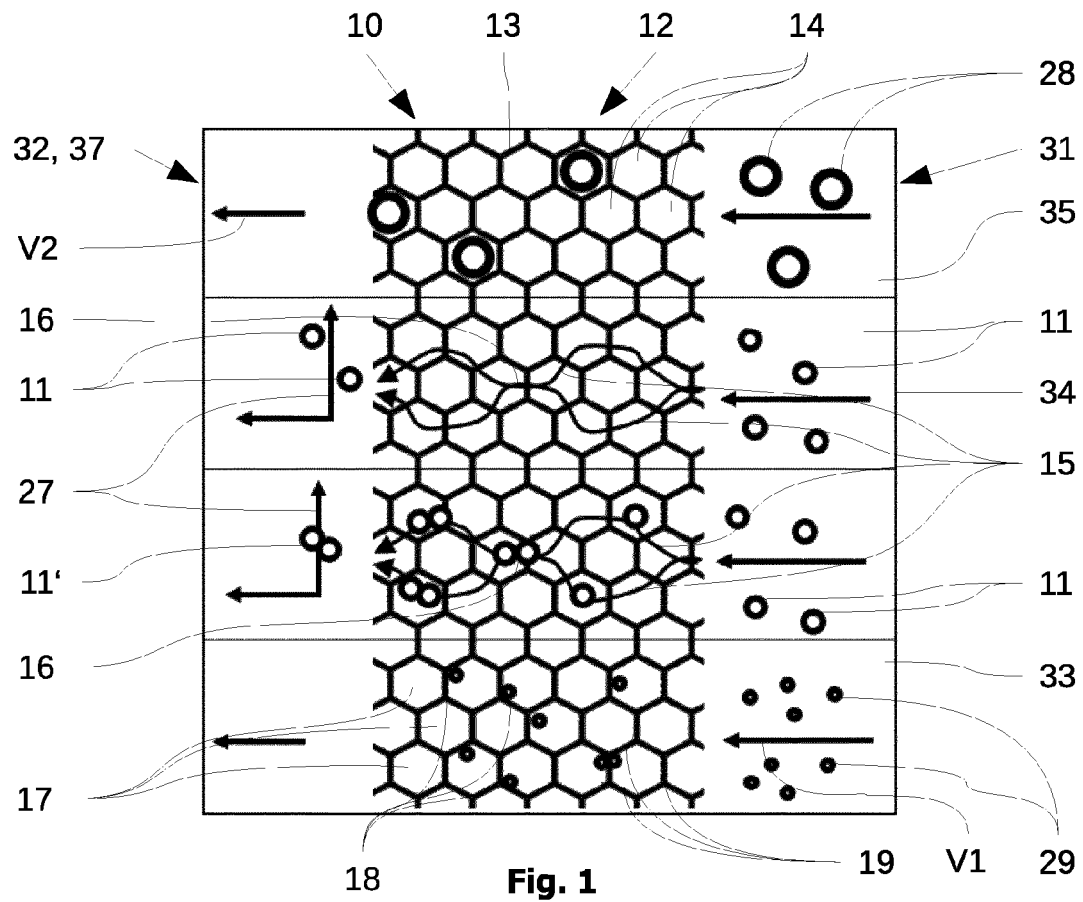
FIG. 1 shows the schematic diagram of a separating element according to an exemplary embodiment according to the invention, during the separation of gas bubbles of different sizes contained in a liquid.

FIG. 1 shows a schematic diagram of a separating element 10 according to an exemplary embodiment according to the invention, during the separation of gas bubbles of different sizes present in a liquid. The separating element 10 serves for separating gas bubbles from liquids such as hydraulic oil, lubricating oil, engine oil or the like. In the following description, the liquids are generally referred to as oil and the gas bubbles as air bubbles.

The separating element 10 is often used in combination with filter devices which, together with a tank, form a tank filter system. Such filter devices are shown in FIGS. 5 and 7 to 10, which will be discussed in more detail later.

According to FIG. 1, an approximately real air bubble distribution is shown in a tank filter system of the aforementioned kind. Conventionally, the separation of the air bubbles from the oil takes place when the oil enters the tank. The separating element 10 can be partially or completely arranged in the oil stored in the tank.

As can be seen in FIG. 1, in a lower region 33 of the tank there are small air bubbles 29, in a middle region 34 are medium-sized air bubbles 11 and in an upper region 35 are large air bubbles 28. This distribution of the air bubbles 11, 28, 29 results from the fact that the small air bubbles 29 have a low buoyancy force in the oil and large air bubbles have a large buoyancy force. Thus, medium-sized air bubbles 11 accumulate in an intermediate layer between the small and large air bubbles.

As shown schematically in FIGS. 1 to 4, the separating element 10 is formed by a volume body 12 having an open-pored material structure 13. The material structure 13 has a plurality of cells 14 which are arranged offset to each other. The cells 14 are offset to each other in such a manner that a plurality of flow paths 15 for guiding the air bubbles 11, 28, 29 through the material structure 13 run in a labyrinth-like manner. The flow paths 15 run three-dimensionally deflected by the material structure 13. The labyrinth-like course of several flow paths 15 is shown schematically, for example, in the middle region 34 according to FIG. 1 and in FIGS. 2 to 4.

During operation, the oil flows into the volume body 12 at an inlet side 31 of the separating element 10 and out of the volume body 12 again at an outlet side 32. The air bubbles 11, 28, 29 in the oil are guided along the flow paths 15 in the volume body 12. FIG. 1 schematically illustrates four of the flow paths 15 as an example.

The flow paths 15 run through the material structure 13, depending on the cell size of the adjacent cells 14. The cell size of the cells 14 can change continuously along the respective flow path 15. It is conceivable that the cell size of the cells 14 increases continuously along the respective flow path 15. In other words, proceeding from a small cell 14, the respective flow path 15 can run in a labyrinth-like manner through increasingly larger cells 14.

The cells 14 each comprise a cell space 17 with several cell openings 18. The adjacent cells 14 are connected to each other by the cell openings 18. The labyrinth-like course of the flow paths 15 can be formed depending on the size of the cell openings 18 and the respective size of the air bubbles 11, 28 and 29. In other words, during operation, the air bubbles 11, 28, 29 can flow along a corresponding flow path 15 depending on the size of the cell openings 18 and the size of the air bubbles 11, 28, 29. For example, if an air bubble 11, 29 is smaller than or equal in size to the cell opening 18, the air bubble 11, 29 can flow through cell opening 18 from a cell 14 to the adjacent further cell 14.

The cell openings 18 of an individual cell 14 can be of different sizes. It is also conceivable that cell openings 18 of an individual cell 14 have the same size. In general, cells 14 have a different cell size. Cells 14 can have a different cell shape. As shown schematically in FIG. 1, the material structure 13 is honeycombed.

Figure 2:
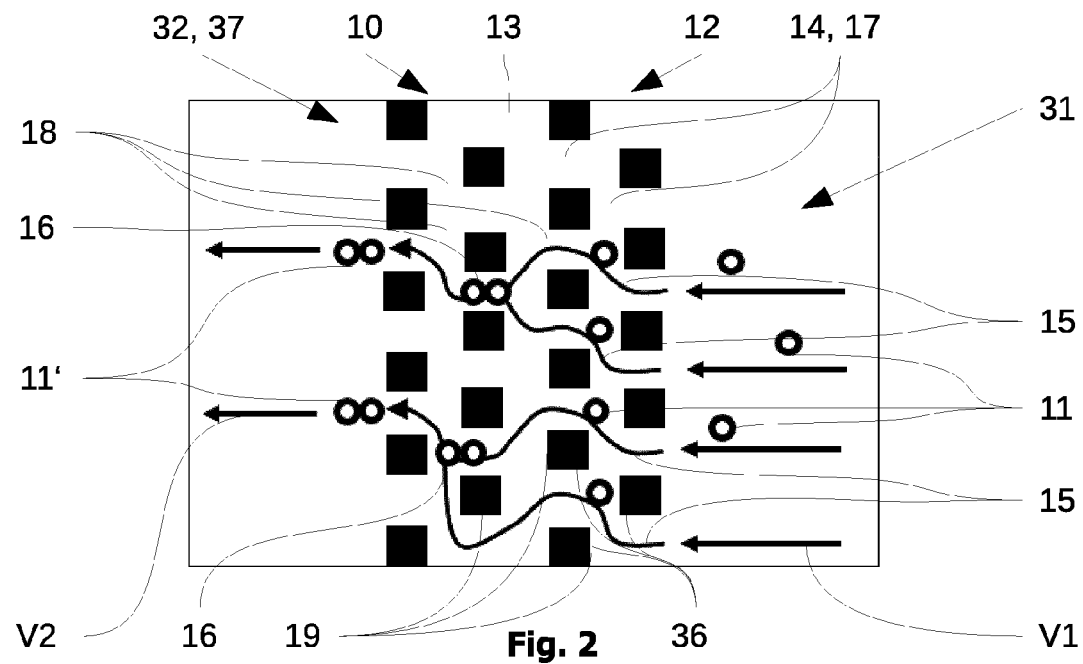
FIG. 2 shows a schematic diagram of the separating element according to FIG. 1, during the separation of gas bubbles of medium size.
Figure 3:
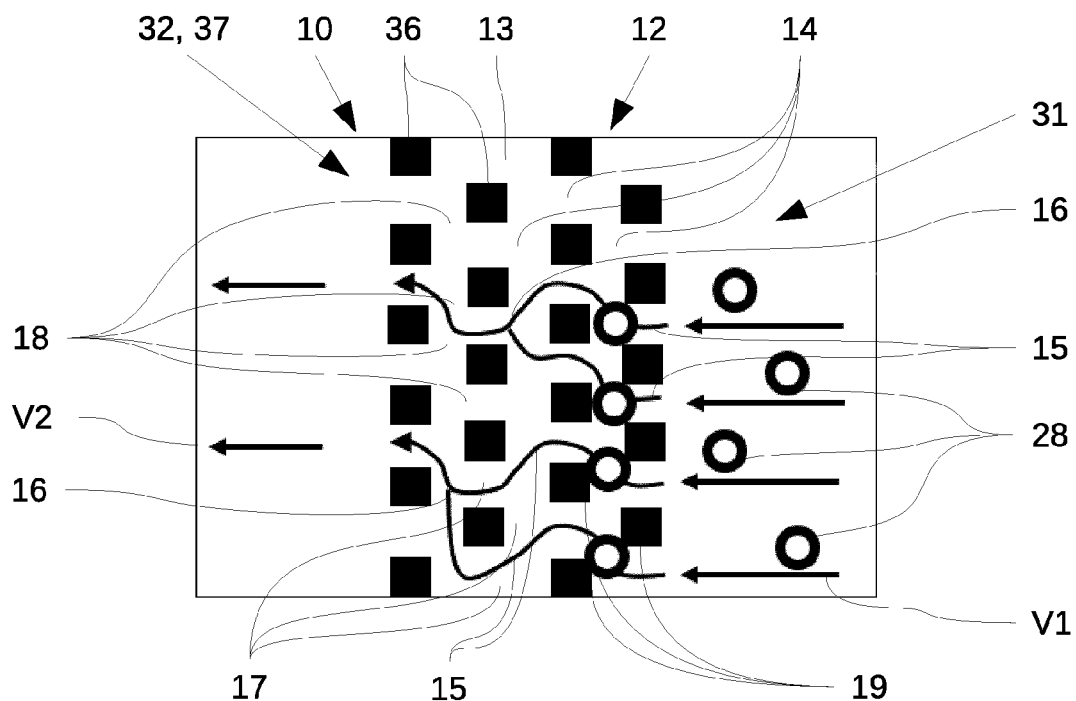
FIG. 3 shows a schematic diagram of the separating element according to FIG. 1, during the separation of large gas bubbles.
Figure 4:
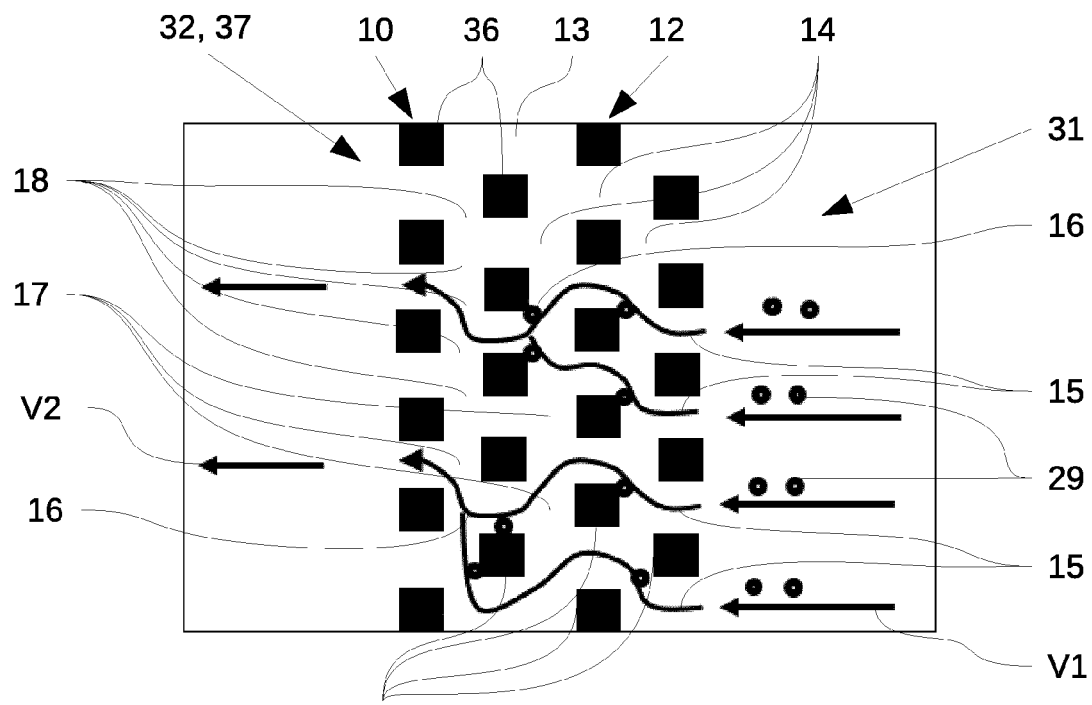
FIG. 4 shows a schematic diagram of the separating element according to FIG. 1, during the separation of dispersed, in particular very small gas bubbles.

In a schematic illustration according to FIGS. 2 to 4, the material structure 13 is configured in a grid-like manner. It can be seen that the cells 14 of the material structure 13 are offset from each other. Cells 14 can be offset from one another at regular or irregular intervals. Thus, when flowing through the volume body 12, the air bubbles 11, 28, 29 are deflected through the material structure 13. In other words, the air bubbles 11, 28, 29 flow in labyrinth-like manner through the volume body 12.

The material structure 13 has several contact regions 16 in which the flow paths 15 approach each other in certain sections. The contact regions 16 are arranged distributed in the material structure 13. The contact regions 16 can be arranged distributed evenly or unevenly. When flowing through the separating element 10, the air bubbles 11 and 29 guided along the flow paths 15 collide and thereby join together to form a larger air bubble 11'. It is also conceivable that due to temporally different occurrences, the air bubbles 11 are guided through the volume body 12 without the air bubbles 11 meeting further air bubbles.

The separating element 10 combines three different types of air bubble separation from the oil, which are explained in more detail below with reference to FIGS. 2 to 4.

FIG. 2 shows a schematic diagram of the separating element 10. The material structure 13 is constructed such that the cells 14 are arranged offset from one another. Here, the squares filled out in black each schematically illustrate a cell web 36 in cross-section, which delimit cell openings 18 formed therebetween. Furthermore, a plurality of cells 14 or cell spaces 17 are provided, which are delimited by the cell webs 36. As can be seen in FIG. 2, the cell openings 18 are of different sizes in some cases.

According to FIG. 2, a separation process of air bubbles 11 having a medium bubble size is shown. The medium-sized air bubbles 11 are formed smaller than the cell space 17 of the cells 14 and/or the cell openings 18. During operation, the oil and the air bubbles 11 contained in the oil flow into the volume body 12 on the inlet side 31 at an inflow velocity V1. Depending on the respective bubble size, the medium-sized air bubbles 11 can flow in a labyrinth-like manner along one or more corresponding flow paths 15 through the volume body 12. Due to the offset arrangement of the cell webs 36 or the cell spaces 17, the flow paths 15 are formed in a labyrinth-like manner in the volume body 12. In other words, the flow paths 15 include a plurality of directional changes, in particular deflections. This results in a labyrinth effect. The individual flow paths 15 of the air bubbles 11 are merged in sections in several, in particular at least two, contact regions 16.

For better illustration, only two contact regions 16 of the flow paths 15 are shown in FIG. 2 as well as FIGS. 3 and 4. In the contact regions 16, the individual air bubbles 11 of the various flow paths 15 collide, thereby destroying a surface boundary layer of the medium-sized air bubbles 11. In the respective contact region 16, the individual air bubbles 11' join together by colliding and form a larger air bubble 11'. In other words, the individual bubbles 11 coalesce to form the larger bubble 11'. This process is generally referred to as coalescence. The larger air bubble 11' then continues to flow along an adapted flow path 15 through the volume body 12. The adapted flow path 15 can subsequently approach one and/or more further flow paths 15, so that the larger air bubble 11' joins together with further air bubbles 11, 11' to form an even larger air bubble. If an enlarged air bubble 11' has a size that is larger than the size of the cell openings 18, it is deposited in cell space 17 between the cell openings 18. In other words, enlarged air bubbles 11' larger than the cell openings 18 are trapped in the corresponding cell space 17.

The enlarged air bubbles 11' exit from the volume body 12 on the outlet side 32 of the separating element 10. Due to the coalescence of the medium-sized air bubbles 11 to larger air bubbles 11', they have an increased vertical ascent energy, in particular ascent speed. This is generally referred to as buoyancy. Due to the increased volume of the air bubbles 11', they rise faster in the oil, which improves outgassing of the air content in the oil.

At the outlet side 32, the oil and the air bubbles 11' contained in the oil have an outflow velocity V2 which is lower than the inflow velocity V1. The separating element 10 homogenizes the flow of the oil so that an enlarged outlet region 37 is formed. Due to the homogenized flow and the reduced outflow velocity V2 on the outlet side 32, a rapid rise of the enlarged air bubbles 11' is facilitated.

FIG. 3 shows a schematic diagram of the separating element 10, wherein large air bubbles 28 are separated from the oil. The large air bubbles 28 are larger than the cell openings 18 of the cells 14. During operation, the oil and the large air bubbles 28 contained in the oil flow into the volume body 12 on the inlet side 31. Since the cell openings 18 are smaller than the large air bubbles 18, the latter cannot flow through the cell openings 18. In other words, the cell openings 18 are formed such that the large air bubbles 28 get stuck at or in the cell openings 18. The large air bubbles 28 accumulate in the cell space 17 between the cell openings 18. The large air bubbles 28 accumulate until a vertical acceleration energy, in particular a buoyancy velocity, is lower than the throughflow velocity of the oil. If the buoyancy of the large air bubbles 28 is less than the throughflow velocity, the large air bubbles 28 exit the volume body 12 and rise rapidly in the oil due to their large buoyancy volume.

FIG. 4 shows a schematic diagram of the separating element 10, wherein dispersed, especially very small, air bubbles 28 are separated from the oil. The small air bubbles 29 are smaller than the cell openings 18 of the cells 14. During operation, the oil and the small air bubbles 29 contained in the oil flow in on the inlet side 31. Since the finely dispersed air bubbles 29 have a very high specific, in particular internal, surface energy, in particular high surface tension, they cannot be joined together by the mere collision of the small air bubbles 29. In order to nevertheless separate the small air bubbles 12 from the oil, the volume body 12 or the material structure 13 is formed from a material which has a low specific surface energy, in particular surface tension, for improved adhesion of the small air bubbles 29. Preferably, the material of the volume body 12 has a lower surface tension than the oil flowing through it. The volume body 12 or the material structure 13 can be formed from a fluorine-containing plastic, in particular PTFE. Furthermore, the volume body 12 can be formed by a three-dimensional plastic fabric or an open-pored plastic foam or an open-pored metal foam or a sintered 3D printing material.

Additionally or alternatively, the material of the volume body 12 has a microstructure 19 for better adhesion of the small air bubbles 29. Specifically, the individual cell webs 36 have the low surface tension and/or the microstructure 19. The microstructure 19 can be formed by a nanocoating. The individual cell webs 36 of a cell 14 each form an adhesive area to which the small air bubbles 29 adhere. From the microscopic point of view, the individual cell webs 36 and the cells 14 adsorb the small air bubbles 29. It is also conceivable that the medium-sized air bubbles 11 and/or the enlarged air bubbles 11' adhere to the cell webs 36.

The small air bubbles 29 flow in a labyrinth-like manner along one or more flow paths 15 through the volume body 12. As described in FIG. 2, the flow paths 15 are formed in the volume body 12. Due to the offset arrangement of the cells 14 or the cell webs 36, the residence time of the small air bubbles 29 in the volume body 12 is extended in order to adhere to the surface of the material structure 13 or the cell webs 36. The small air bubbles 29 accumulate on the cell webs 36. From the macroscopic point of view, the small air bubbles 29 are absorbed by the volume body 12 or the separating element 10 and thus are separated from the oil.

Figure 5:
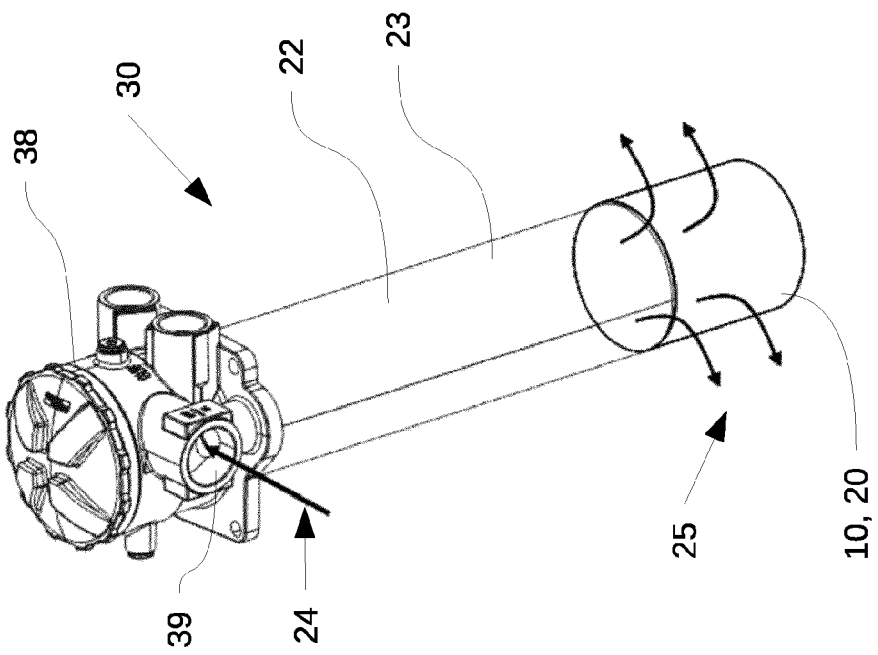
FIG. 5 shows a perspective view of a filter device according to an exemplary embodiment according to the invention.

FIG. 5 shows a perspective view of a filter device 30 comprising a filter head 38, a filter housing 22 and a separating element 10 according to FIGS. 1 to 4. Furthermore, the filter device 30 has a filter element 21 according to FIG. 6, which is covered by the filter housing 22. The filter housing 22 and the separating element 10 are of cylindrical shape. The filter housing 22 is arranged on the filter head 38. Furthermore, the separating element 10 is arranged on the filter housing 22.

The filter device 30 has an inlet side 24, wherein during operation, the oil flows into the filter head 38 through an inlet opening 39. The flow direction of the oil is indicated by the arrows shown. Furthermore, the filter device 30 has an outlet side 25 on which the separating element 10 is arranged. During operation, the oil flows on the outlet side 25, for example, into a storage tank, in particular a hydraulic tank. Specifically, the separating element 10 is connected to the filter housing 22. The filter housing 22 forms a filter outlet tube 23. According to FIG. 5, the filter housing 22 and the separating element 10 are provided as a unit. The separating element 10 can be part of a separating unit which is detachably connected to the filter housing 22.

Figure 6:
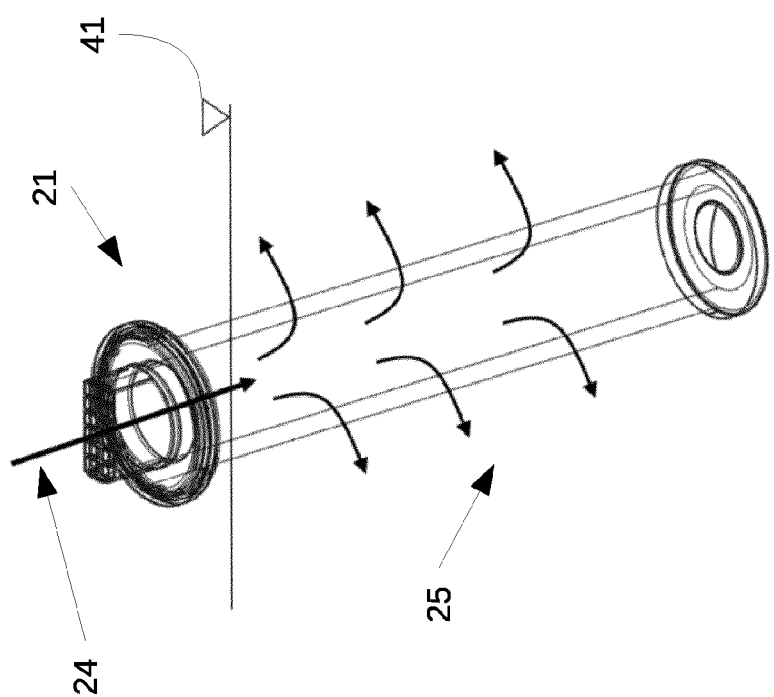
FIG. 6 shows a perspective view of a filter element of a filter device according to FIG. 5.

FIG. 6 shows a filter element 21 inserted into the filter housing 22 of the filter device 30 according to FIG. 5. The filter element 21 is designed to be exchangeable. As shown in FIG. 6, during operation, the oil flows through the filter element 21 from the inside to the outside. According to FIG. 5, an annular space, which is not shown, is formed between the filter element 21 and the filter housing 22, in which the oil flows to the separating element 10. Air bubbles 11, 28, 29 trapped in the oil are separated from the oil in the separating element 10. Thus, the oil is cleaned by the separating element 10.

Figure 7:
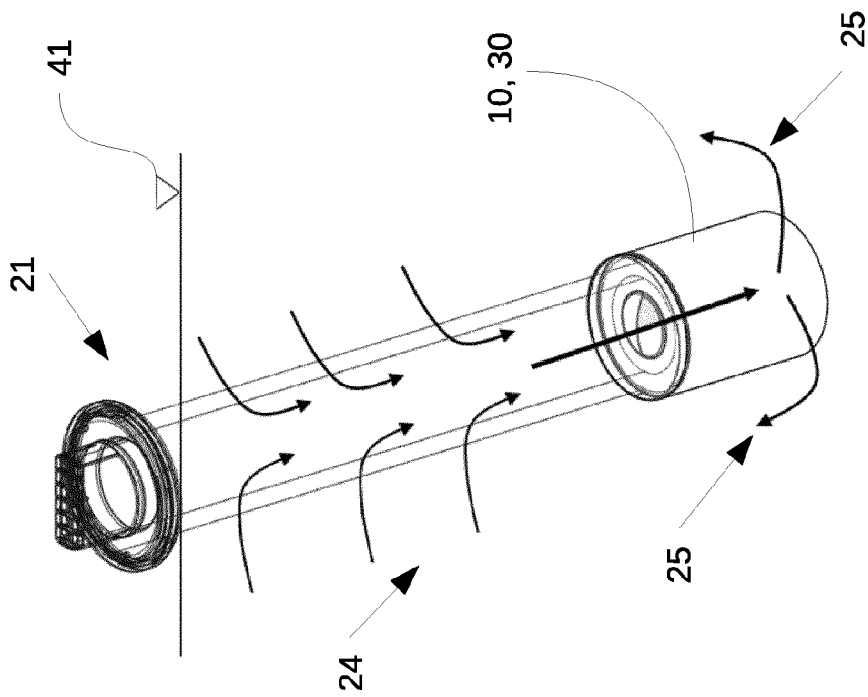
FIG. 7 shows a perspective view of a filter element according to an exemplary embodiment according to invention.

FIG. 7 shows a filter element 21 according to an exemplary embodiment according to the invention, wherein during operation, the flow through the filter element 21 runs from the outside to the inside. A separating element 10 according to FIGS. 1 to 4 is provided on the filter element 21. The separating element 10 is arranged downstream of the filter element 21 as viewed in the longitudinal direction. The separating element 10 has a cylindrical shape. The separating element 10 can be part of a separating unit which is detachably connected to the filter element 21. In the installed state of the filter element 21, the separating element 10 is completely arranged in the oil. This can be seen from the liquid level 41 shown. It is also conceivable that in the installed state of the filter element 21, the separating element 10 is partially arranged in the oil. This also applies to the separating elements 10 according to FIGS. 8 to 10.

Figure 8:
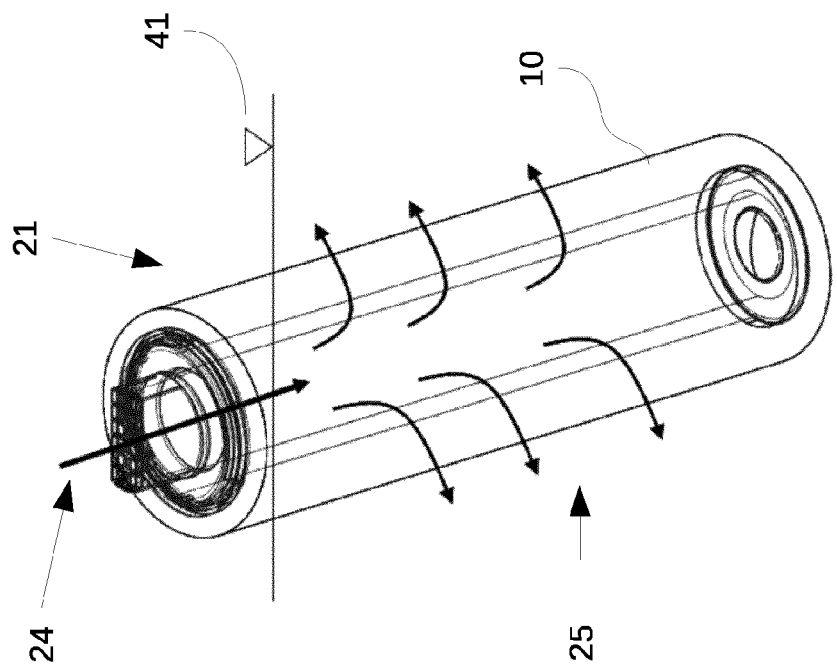
FIG. 8 shows a perspective view of a filter element according to a further exemplary embodiment according to the invention.

In a filter element 21 according to FIG. 8, a separating element 10 according to FIGS. 1 to 4 is provided, which is arranged laterally on the filter element 21 on the outflow side. In other words, the separating element 10 on the filter element 21 is arranged radially outside transverse to the longitudinal direction of the filter element 21. As can be seen from the arrows illustrated, the flow during operation runs through the filter element 21 from the inside to the outside.

Figure 9:
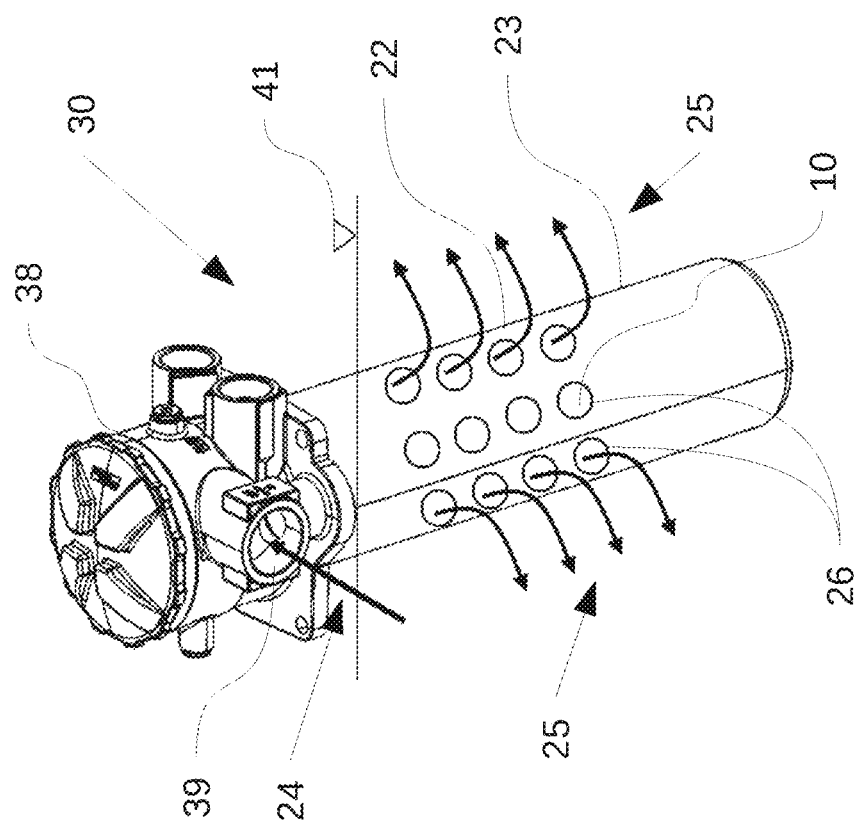
FIG. 9 shows a perspective view of a filter device according to another exemplary embodiment according to the invention.

Filter element 21 is arranged, for example, in a filter device 30 according to FIG. 9. Specifically, the filter element 21 in FIG. 9 is arranged according to FIG. 8 in such a manner that the separating element 10 is arranged radially between an inner wall of the filter housing 22 and a radial outer side of the filter element 21. The filter housing 22 of the filter device 30 has several outlet openings 26 through which the oil flows out of the filter housing 22 during operation. The outlet openings 26 on the filter housing 22 extend circumferentially in an evenly distributed manner. The outlet openings 26 are circular in shape. It is also conceivable that the outlet openings 26 are slit-shaped or have a different shape.

Figure 10:
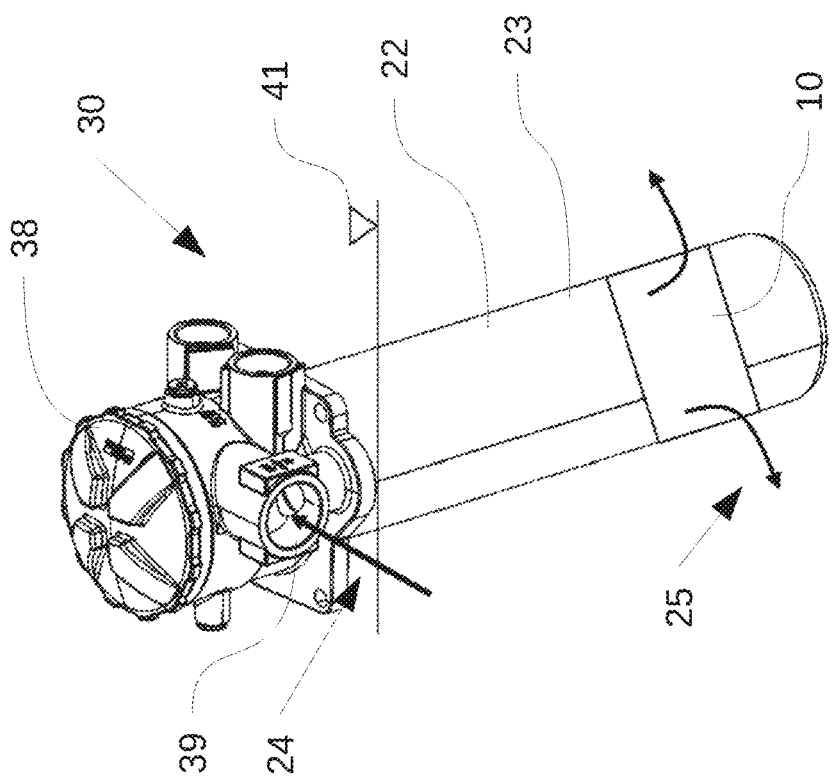
FIG. 10 shows a perspective view of a filter device according to another exemplary embodiment according to the invention.

FIG. 10 shows a perspective view of a filter device 30 according to another exemplary embodiment according to the invention. As with the filter devices 30 according to FIGS. 5 and 9, the filter device 30 according to FIG. 10 has an inserted filter element 21 and a separating element 10 according to FIGS. 1 to 4. In the case of the filter device according to FIG. 10, the separating element 10 is arranged in a lower region of the filter housing 22. In other words, the separating element 10 is arranged in the filter housing 22. The separating element 10 is provided between the inner wall of the filter housing 22 and the outer jacket of the filter element 21. During operation, the oil flows through the filter element 21 from the inside to the outside, wherein the oil flows out laterally through the filter housing 22.

REFERENCE LIST

10 Separating element
11, 11' Gas bubble
12 Volume body
13 Open-pored material structure
14 Cells
15 Flow path
16 Contact region
17 Cell space
18 Cell opening
19 Microstructure
20 Separating unit
21 Filter element
22 Filter housing
23 Filter outlet tube
24 Inlet side
25 Outlet side
26 Outlet openings
27 Buoyancy force
28 Large gas bubble
29 Small gas bubble
30 Filter device
31 Inlet side
32 Outlet side
33 Lower region
34 Middle region
35 Upper region
36 Cell web
37 Outlet region
38 Filter head
39 Inlet opening
41 Liquid level
V1 Inflow velocity
V2 Outflow velocity

The invention claimed is:

1. A filter device comprising:
at least one filter element configured to clean hydraulic oil, the at least one filter element having an inlet side, an outlet side, and at least one filter housing, wherein at least one filter layer configured to filter solids present in the hydraulic oil is arranged between the inlet side and the outlet side, wherein the filter device includes a separating unit configured to separate gas bubbles from the hydraulic oil,
at least one separating element mounted on one of (i) the at least one filter element, (ii) the filter housing or (iii) both, wherein the separating element separates gas bubbles from the hydraulic oil and includes,
a volume body with an open-pored material structure having a plurality of cells offset with respect to one another such that a plurality of flow paths for guiding the gas bubbles through the material structure flow in a three-dimensional arrangement to facilitate coalescence of individual gas bubbles, and
a contact region included in the material structure, wherein at least two of the flow paths approach one another in the contact region at least in sections so that, in operation, the guided gas bubbles on the flow paths contact one another to join together to form larger gas bubbles, wherein the filter housing and the separating element are of cylindrical shape, and wherein the separating element is arranged downstream of the filter element as viewed in a longitudinal directions.

2. The filter device of claim 1, wherein the separating element is configured and arranged between the filter element and the filter housing having a plurality of outlet openings through which liquid flows out of the filter housing during operation.

3. The filter device of claim 1, further comprising a return filter for cleaning liquids, the return filter having the separating element.

4. The filter device of claim 1, wherein the filter housing includes a filter outlet pipe.

5. The filter device of claim 1, wherein the three-dimensional arrangement of the material structure includes an offset arrangement of cell webs or cell spaces.

* * * * *

UNITED STATES PATENT AND TRADEMARK OFFICE
CERTIFICATE OF CORRECTION

| | | |
|---|---|---|
| PATENT NO. | : 12,246,269 B2 | Page 1 of 1 |
| APPLICATION NO. | : 17/430258 | |
| DATED | : March 11, 2025 | |
| INVENTOR(S) | : Andras Veres | |

It is certified that error appears in the above-identified patent and that said Letters Patent is hereby corrected as shown below:

In the Claims

Claim 1:
Column 12, Line 36:
"element as viewed in a longitudinal directions."
Should read:
-- element as viewed in a longitudinal direction. --

Signed and Sealed this
Fifteenth Day of July, 2025

Coke Morgan Stewart
*Acting Director of the United States Patent and Trademark Office*